(12) United States Patent
Lee et al.

(10) Patent No.: US 8,284,032 B2
(45) Date of Patent: Oct. 9, 2012

(54) METHOD AND APPARATUS FOR SIGNAL DETECTION IN RADIO FREQUENCY IDENTIFICATION SYSTEM

(75) Inventors: Jong-Rim Lee, Seoul (KR); Sang-Yun Hwang, Seoul (KR); Chul-Jin Kim, Yongin-si (KR); June-Hyeok Im, Seoul (KR); Hyun-Kuk Choi, Seoul (KR); Chul-Hyun Park, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1321 days.

(21) Appl. No.: 11/946,480

(22) Filed: Nov. 28, 2007

(65) Prior Publication Data

US 2008/0150700 A1 Jun. 26, 2008

(30) Foreign Application Priority Data

Nov. 28, 2006 (KR) .................. 10-2006-0118503
Mar. 30, 2007 (KR) .................. 10-2007-0031483

(51) Int. Cl.
*H04Q 5/22* (2006.01)
(52) U.S. Cl. .................................... 340/10.32
(58) Field of Classification Search ............ 340/10.1, 340/10.32; 455/296, 284, 121, 324, 78; 375/296
See application file for complete search history.

(56) References Cited

U.S. PATENT DOCUMENTS

| | | | | |
|---|---|---|---|---|
| 5,966,410 A * | 10/1999 | Freyman et al. | ............. | 375/296 |
| 6,617,962 B1 | 9/2003 | Horwitz | | |
| 7,522,887 B2 * | 4/2009 | Nagano et al. | ................... | 455/78 |
| 7,822,397 B2 * | 10/2010 | Horvath et al. | ............. | 455/161.3 |
| 2005/0007240 A1 * | 1/2005 | Moyer | ..................... | 340/10.32 |
| 2005/0143026 A1 * | 6/2005 | Bellantoni | ..................... | 455/121 |
| 2006/0186995 A1 * | 8/2006 | Wu et al. | ..................... | 340/10.1 |
| 2006/0252398 A1 * | 11/2006 | Park et al. | ..................... | 455/296 |
| 2007/0111697 A1 * | 5/2007 | Bellantoni | ..................... | 455/324 |
| 2007/0176746 A1 * | 8/2007 | Lee et al. | ..................... | 340/10.1 |
| 2008/0238622 A1 * | 10/2008 | Rofougaran et al. | ......... | 340/10.1 |
| 2009/0093228 A1 * | 4/2009 | Rostami et al. | ............... | 455/284 |

FOREIGN PATENT DOCUMENTS

KR 1020040032672 4/2004
KR 100666340 1/2007

* cited by examiner

*Primary Examiner* — Jennifer Mehmood
*Assistant Examiner* — Kaleria Knox
(74) *Attorney, Agent, or Firm* — The Farrell Law Firm, P.C.

(57) ABSTRACT

Disclosed is an apparatus and method for signal detection according to frequency bands used in an RFID system. The apparatus includes a low-noise amplifier for low-noise amplifying a received signal, a receiver unit for detecting a CW signal and a tag signal, a transmitter unit for frequency up-converting and outputting an input signal, a PLL for generating a frequency signal according to a transmission signal band or a reception signal band, a receiver unit switch for connecting the receiver unit with the low-noise amplifier or a directional coupler, an antennas switch for connecting the antenna with the directional coupler or low-noise amplifier, and a controller unit for controlling a frequency of the frequency signal generated by the PLL, turning off transmission power in a case of an LBT scheme, controlling the receiver unit switch and the antenna switch, and determining if a corresponding channel is an idle channel.

13 Claims, 13 Drawing Sheets

METHOD AND APPARATUS FOR SIGNAL DETECTION IN RADIO FREQUENCY IDENTIFICATION SYSTEM

PRIORITY

This application claims priority to applications entitled "Method and Apparatus for Signal Detection in Radio Frequency Identification System" filed in the Korean Industrial Property Office on Nov. 28, 2006 and Mar. 30, 2007, and assigned Serial Nos. 2006-0118503 and 2007-0031483 respectively, the contents of each of which are hereby incorporated by reference.

BACKGROUND OF THE INVENTION

1. Field of the Invention

The present invention relates to a method and apparatus for signal detection in a Radio Frequency IDentification (RFID) system, and more particularly to a method and apparatus for detecting signals according to frequency bands used in an RFID system.

2. Description of the Related Art

In general, radio frequency systems are used in various fields, such as voice and data communication, which are types of bidirectional communication services, broadcast communication, which is a type of unidirectional communication service, etc. Also, with the development of radio frequency communication technology, the radio frequency systems are evolving toward providing various conveniences to users. The evolution of these radio frequency systems substantially contributes to implementing ubiquitous systems. One radio frequency system contributing to the implementation of the ubiquitous systems is an RFID system. This RFID system is a system that can be used in various applications, such as inventory management, automatic inspection, warehousing/delivery management, product traceability for preventing theft of freights, etc.

FIG. 1 illustrates a conceptual view for explaining the operation of the RFID system.

The RFID system consists of a product 10 to which an RFID tag (hereinafter, "tag") 11 is attached, an RFID reader (hereinafter, "reader") 20 with an antenna 21, and a host computer 30 for gathering information of the reader 20. The RFID system is largely divided into an active type in which the tag 11 has its own power supply, and a passive type in which the tag 11 doesn't have its own power supply, but is activated by the electromagnetic field of the external reader 20. The active type RFID system does not require the reader to select a channel, and needs no construction for transmitting an electromagnetic field to the tag, so a description will be given below only of the passive type RFID system.

Also, the passive type RFID system is divided into the American type employing a Frequency Hopping Spread Spectrum (FHSS) scheme, and the European type employing a Listen Before Talk (LBT) scheme, according to the scheme in which the reader selects a channel. The FSSH scheme is a scheme in which the reader 20 transmits a Continuous Wave (CW) signal while randomly shifting a specific channel, and waits for a response thereto from the tag 11. In contrast, the LBT scheme is a scheme in which, in order to select an available channel, the reader 20 checks whether a currently selected channel is occupied by another reader, through an energy measurement method before transmitting a CW signal.

The energy measurement method refers to a method in which whether there is the energy (power) of a CW signal transmitted by another reader is checked for any channel, and the channel is considered an idle channel when power caused by a CW signal from another reader is not detected. The aforementioned two schemes of the passive type RFID system are common in that a CW signal is generated in the reader 20, and a signal fed back from the tag 11 is detected. However, they have a difference in that the FHSS scheme uses a channel randomly selected from among selectable channels, and the LBT scheme uses a channel selected by checking an idle channel from among selectable channels.

If a CW signal is transmitted over a channel selected using the FHSS or LBT scheme, the tag 11 transmits a tag signal to the reader 20 by using the CW signal, and thereby the reader 20 acquires the tag signal, the reader 20 transfers the tag signal to the host computer 30 by wire 25 or radio 36. Here, the reader 20 may employ various schemes for transmitting data to the host computer 30 by radio 26.

Hereinafter, the structure and operation of a general reader 20 will be described in detail. FIG. 2 illustrates the internal structure of a Radio Frequency (RF) transmitter/receiver unit of a general reader in an RFID system.

The structure of the reader 20 illustrated in FIG. 2 includes only a structure for signal transmission/reception with the tag 11. That is, it should be noted that parts connected with the host computer 30 are not illustrated in the drawing. Also, the reader 20 of FIG. 2 can support the FHSS scheme, but cannot support the LBT scheme. The reason for this will be described in detail below in conjunction with FIG. 3. Reference will now be made in detail to the structure of FIG. 2 and a procedure of performing the FHSS scheme in the structure of FIG. 2.

The reader 20 of FIG. 2 includes a receiver unit 210, a transmitter unit 230, a Phase Locked Loop (PLL) 221, a directional coupler 201, a power amplifier 202, and a controller unit 240 for controlling the PLL 221.

First, in order to transmit a signal to the RFID tag 11 by the transmitter 230, data to be transmitted is input from I and Q channels to the transmitter 230. That is, level shifters 235 and 236 of the transmitter unit 230 receive I channel input data and Q channel input data, shift them to corresponding levels, and then inputs the level-shifted data into low-pass filters 233 and 234 corresponding to the respective data. Each of the low-pass filters 233 and 234 then filters the input signal according to a predetermined filtering band, and outputs the filtered signal. The filtered signals are input into mixers 231 and 232, respectively. The mixers 231 and 232 receive signals of the I and O channels from the PLL 221, up-convert the filtered signals to a high frequency band, and then output the up-converted signals, respectively.

The signals output from the transmitter unit 230 in this way are input into the power amplifier 202. The power amplifier 202 amplifies the power of the input signal to a transmission power level, and outputs the power-amplified signal, which in turn is input into the directional coupler 201. The directional coupler 201 splits a transmission CW signal according to paths, and outputs the split signals to an antenna 21 to thereby transmit them to the tag 11. Also, a signal received by the antenna 21 is split according to reception paths in the directional coupler 201, and the split signals are input into the receiver unit 210. Reference will now be made to the structure and operation of the receiver unit 210.

A received signal output from the directional coupler 201 is input into mixers 211, 212. The mixers 211 and 212 receives signals for phase locking according to the I and Q channels, output from the PLL 221, and down-convert the input signals to a low frequency band, and then output the down-converted signals, respectively. The down-converted signals are input into Direct Current (DC) removers 213 and 214 according to the respective channels.

The DC removers 213 and 214 remove DC components from the input signals, and then output them. The signals output from the DC removers 213 and 214 are input into low-pass filters/gain controllers 215 and 216 of the I and Q channels. The low-pass filters/gain controllers 215 and 216 filter the input signals corresponding to the respective channels, adjust the gains of the received signals, and then output the gain-adjusted signals. The controller unit 240 controls the PLL 221 to output a desired frequency according to the frequency band of the corresponding channel, and the PLL 221 performs phase locking according to the base frequency of the corresponding channel, generated by the controller unit 240.

In short, the procedure of performing the operation according to FHSS scheme in the aforementioned reader structure is as follows: The controller unit 240 controls the PLL 221 to output a frequency of a desired Frequency band, and subsequently controls the transmitter unit 230 to output a CW signal. Then, the tag 11 is supplied with power from the transmitted CW signal, and transmits a tag signal to the reader. The so-transmitted tag signal is input from the directional coupler 201 to the receiver unit 210 through the antenna 21. The receiver unit 210 processes the received signal by splitting the received signal into signals according to channels and outputting the split signals.

As described in FIG. 2, the reader transmits the CW signal, output from the transmitter unit, through the antenna. However, since it is very difficult to implement impedance matching between the transmitter unit and the antenna, the receiver unit may receive a part of the CW signal output from the transmitter unit. That is, although the CW signal output form the transmitter unit is transmitted through the antenna, there is a reflected signal of the CW signal due to imperfect impedance matching, and thus the receiver unit receives the reflected signal.

Further, since the tag signal uses the electromagnetic filed of the CW signal, the intensity of the signal's power is smaller than that the intensity of the power of the CW signal. Thus, there often occurs a phenomenon that the power of the reflected signal is larger than that of the tag signal. Consequently, in order to improve the reception quality of the tag signal, the DC removers 213 and 214 are configured in such a manner as to remove the reflected signal. However, the reflected signal is not completely removed by the DC removers 213 and 214, but partially passes through them, as a result of which the reflected signal may become noise to the tag signal. Using a low-noise amplifier in the receiver unit may enhance the reception sensitivity of the received signal including the tag signal and the noise signal, but the linearity level of the received signal at the input of the receiver unit is lowered because the noise signal is amplified. It is known that the reader must have a wide range of linearity level in order to be able to accurately detect a received signal. Thus, since using the low-noise amplifier makes the range of a linearity level narrow, as mentioned above, the low-noise amplifier is not used in the conventional reader.

Next, problems that the reader has with performing the LBT scheme will be discussed. As mentioned above, the LBT scheme is a scheme in which whether a channel is occupied by another reader it is determines so as to search for a channel to be used by a corresponding reader. However, the conventional reader has a problem in that the conventional reader cannot detect a CW signal transmitted by another reader that occupies a corresponding channel. This will be described with reference to FIG. 3.

FIG. 3 illustrates the frequency spectrum of a received signal in the conventional reader. The frequency spectrum illustrated in FIG. 3 accounts for why the conventional reader cannot support the LBT scheme. In FIG. 3, reference numeral 301 designates a CW signal transmitted by another reader and input into the receiver unit of a corresponding reader, and reference numeral 303 designates a tag signal that is transmitted by the tag 11 that has received the CW signal designated by reference numeral 301. There is a certain frequency difference between the CW signal and the tag signal so as to distinguish between transmission and reception frequencies of the reader. Reference numeral 305 designates frequency responses of the DC removers 213 and 214 of the reader, which show the characteristic of a band-pass filter.

As seen from FIG. 3, the CW signal is mostly removed by the DC removers 213 and 214 because the signal is out of the passband of the DC removers 213 and 214. As a result, the corresponding reader cannot adequately detect the power of the CW signal, and thus cannot know if a corresponding channel is occupied by another reader. Therefore, the LBT scheme cannot be supported by the structure of the conventional receiver unit 210.

Further, in view of the reception sensitivity of a signal received by the reader, the LBT scheme requires a reception sensitivity of about −96 dBm according to the European standard, but the present receiver unit 210 is difficult to support such high sensitivity corresponding to the European standard because the receiver unit 210 does not use a low-noise amplifier for the aforementioned reason. In the end, the reader with the structure illustrated in FIG. 2 has a problem in that the reader can support only the FHSS scheme, and cannot support the LBT scheme.

Further, in the structure of the receiver unit 210 of the conventional reader, a received signal passes through the directional coupler 201 via the antenna 21. However, it is known that the directional coupler 201 reduces the input linearity range of the receiver unit 210 by attenuating a signal output to the receiver unit 210. That is, since the directional coupler 201 attenuates a signal to be input into the receiver unit 210, the reception sensitivity and input linearity of the receiver unit 210 are lowered, which makes it difficult to detect the received signal. Thus, in order to solve the problem of lowering in the input linearity level, the conventional reader uses mixers with a wide range of input linearity, which results in a high cost.

Therefore, the conventional reader constructed as described above has the following problems: firstly, the conventional reader cannot support the LBT scheme because a CW signal from another reader is removed by the mixers 213 and 214. Secondly, the conventional reader does not use a low-noise amplifier so as to ensure a wide range of input linearity, and thus cannot obtain reception sensitivity enough to support the LBT scheme according to the European standard. Thirdly, since a receive signal that has passed through the antenna 21 is input into the receiver unit 210 via the directional coupler 201, the reception sensitivity of the received signal is lowered.

SUMMARY OF THE INVENTION

Accordingly, the present invention has been made to solve at least the above-mentioned problem occurring in the prior art, and the present invention provides a method and apparatus for signal detection in an RFID system, which supports high reception sensitivity.

Further, the present invention provides a method and apparatus for signal detection in an RFID system, which provides a wide range of input linearity.

Further, the present invention provides a method and apparatus for signal detection in an RFID system, which supports the LBT scheme employed in the European type RFID system.

In an accordance with an aspect of the present invention, there is provided an apparatus for signal detection of a reader in an Radio Frequency IDentification (RFID) system, the apparatus includes a low-noise amplifier for low-noise amplifying a received signal of an antenna; a receiver unit for detecting a Continuous Wave (CW) signal and a tag signal in the low-noise amplified signal; a transmitter unit for frequency up-converting an input signal, and outputting the up-converted signal; a Phase Locked Loop (PLL) for generating a frequency signal according to a transmission signal band or a reception signal band, and transferring the generated frequency signal to a transmitter unit or a receiver unit; a receiver unit switch for connecting the receiver unit with the low-noise amplifier or a directional coupler; an antenna switch for connecting the antenna with the directional coupler or the low-noise amplifier; and a controller unit for controlling a frequency of the frequency signal generated by the PLL, turning off transmission power in a case of an Listen Before Talk (LBT) scheme, controlling the receiver unit switch to connect the receiver unit with the low-noise amplifier, controlling the antenna switch to connect the antenna with the low-noise amplifier, and determining if a corresponding channel is an idle channel, by using a power value of the signal output from the transmitter unit.

In accordance with another aspect of the present invention, there is provided a method for signal detection of a reader in an RFID system, the method includes a setup step of turning off transmission power in a case of an Listen Before Talk (LBT) scheme, switching an antenna provided in the reader to a receiver unit provided in the reader, and setting a fundamental frequency corresponding to a channel where the LBT scheme is to be performed; a low-noise amplification step of low-noise amplifying a signal received by the antenna; a signal detection step of frequency down-converting a signal input into the receiver unit, removing a DC component from the frequency down-converted signal in a predetermined manner, and then low-pass filtering the DC-removed signal; and a channel check step of determining if the channel is an idle channel, by using a power value of the low-pass filtered signal.

In accordance with yet another aspect of the present invention, there is provided a method for signal detection of a reader in an RFID system, the method includes including a group setting step of setting a given number of neighboring channels among channels allocated to the RFID system as a channel group; a group filter setting step of changing frequency characteristics of a DC remover and a low-pass filter, which are provided in a receiver unit included in the reader, in such a manner as to correspond to an overall frequency band of the channel group; a group filtering step of low-noise amplifying a signal of the channel group, down-converting the low-noise amplified signal to a low frequency band, removing a DC component from the down-converted signal, and low-pass filtering the DC-removed signal; a group power measurement step of measuring a power value of the low-pass filtered signal; and an idle group check step of determining if the channel group is an idle group including an idle channel, by using the measured power value.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
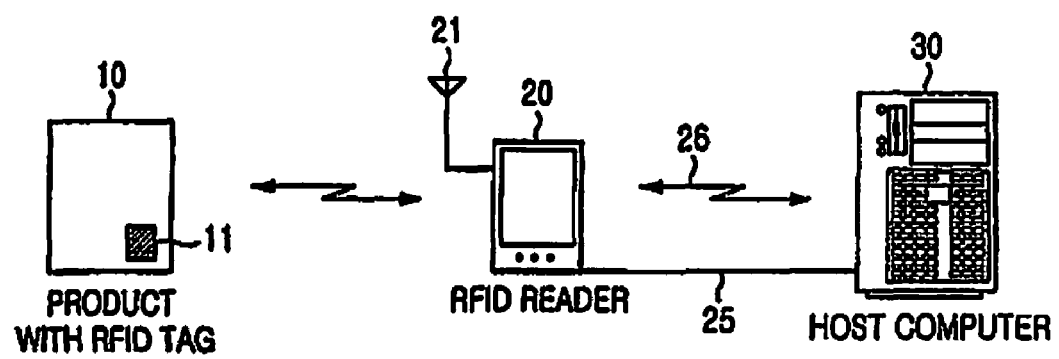
FIG. 1 is a conceptual view for explaining an operation of an RFID system.

Hereinafter, exemplary embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

Figure 2:
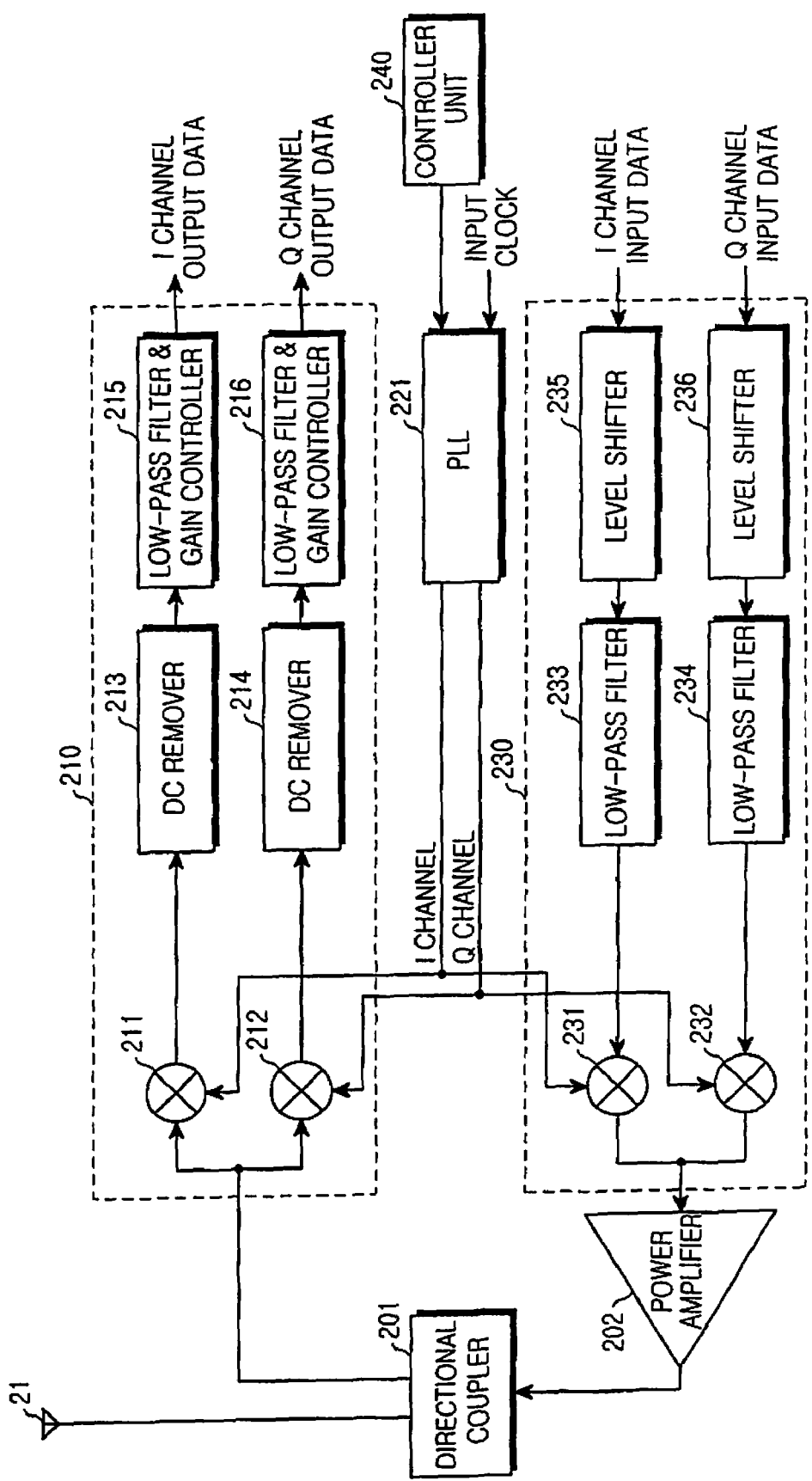
FIG. 2 is a block diagram illustrating an internal structure of an RF transmitter/receiver unit of a general reader in an RFID system.
Figure 4:
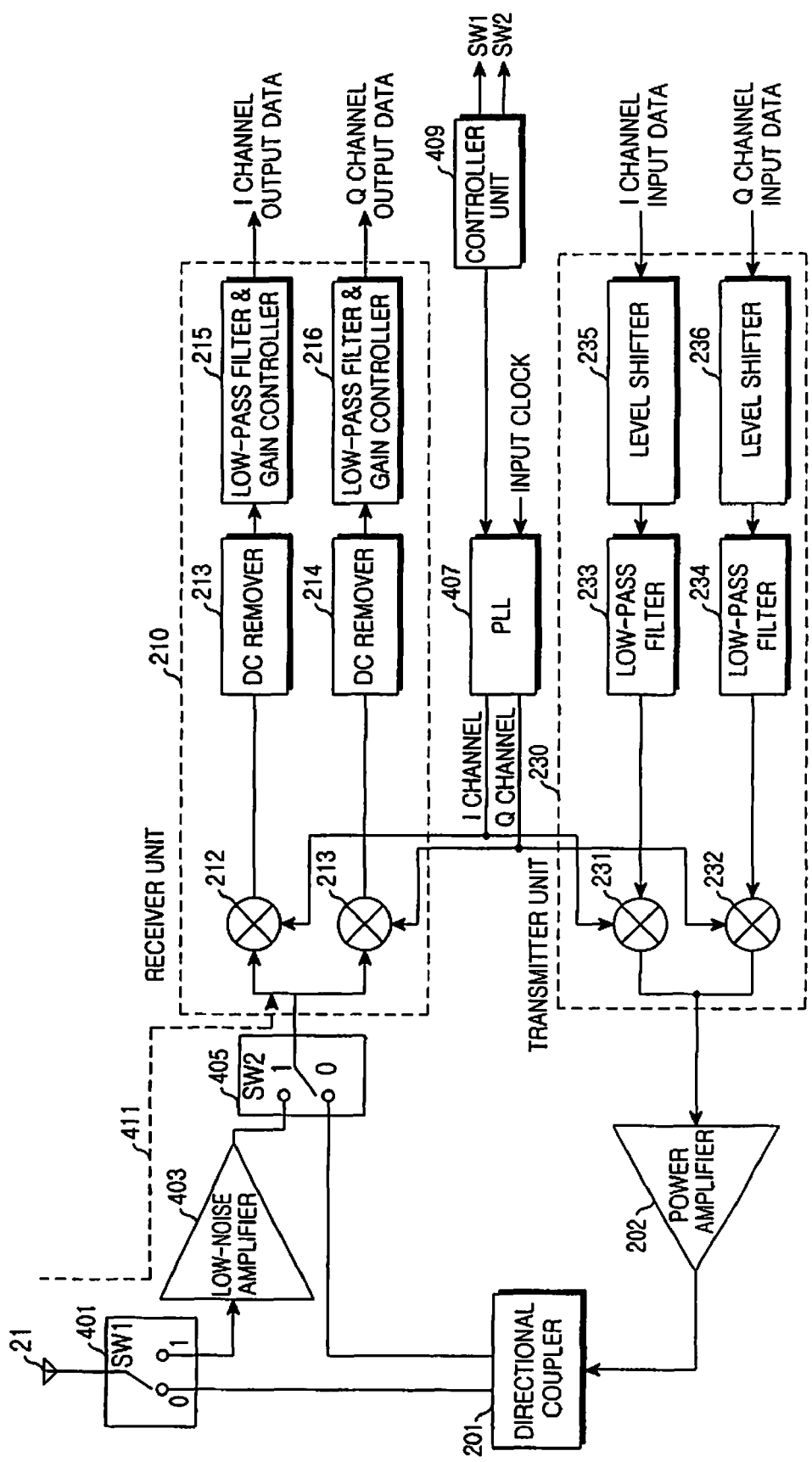
FIG. 4 is a block diagram illustrating a structure of a reader supporting the LBT scheme in accordance with a first exemplary embodiment of the present invention.

FIG. 4 illustrates the structure of a reader supporting the LBT scheme according to a first exemplary embodiment of the present invention. In FIG. 4, the same parts as those in FIG. 2 are designated by the same reference numerals. In the present invention, a transmitter unit has the same structure as that of the transmitter unit 230 illustrated in FIG. 2. That is, the transmitter unit 230 performs the same operation as that described above in the related art, so a description thereof will be omitted.

In comparison with the reader illustrated in FIG. 2, the reader of FIG. 4 further includes an antenna switch 401, a receiver unit switch 405, and a low-noise amplifier 403. Also, a controller unit 409 controls a PLL 407 and the switches 401 and 405. First of all, the antenna switch 401 and the receiver unit switch 405 are set to position "0" in the FHSS scheme, and the FHSS scheme operates in the same way as described above in connection with FIG. 2. Thus, a description thereof will be omitted.

However, in the LBT scheme, the controller unit 409 controls the antenna switch 401 to connect an antenna 21 with the low-noise amplifier 403, and controls the receiver unit switch 405 to connect a receiver unit 210 with the low-noise amplifier 403. Also, the controller unit 409 turns off the power of the transmitter unit 230 so as not to generate a CW signal in the transmitter unit 230. This is because the LBT scheme is a scheme for detecting a CW signal transmitted by another reader before the transmitter unit 230 transmits a CW signal. That is, this is intended to remove the influence of a reflected signal caused by the CW signal that the transmitter unit 230 transmits. In the LBT mode in which the reflected signal transmitted by the transmitter unit 230 is not included in a signal received by the receiver unit 210, the power level of the received signal is lower than that in a normal operation in which a signal including the reflected signal caused by the CW signal is received. Thus, in this case, it is preferred to use the low-noise amplifier 403 and mixers 211 and 212 with good noise characteristics in the receiver unit 210. In this way, the sensitivity of a received signal in the LBT mode can be improved. Usually, the power of a signal that has passed through the receiver unit 210 is measured in a baseband processor unit (not illustrated). If a result of the power measurement shows that a corresponding channel is occupied by another reader, a next channel is checked using the LBT scheme. However, if the corresponding channel is an idle channel, the LBT mode ends, and a CW signal is transmitted over the corresponding channel.

The antenna switch 401 switches the antenna 21 to the receiver unit 210 such that a signal received by the antenna 21 can be input directly into the receiver unit 210. The PLL 407 generates the fundamental frequencies of a corresponding channel so as to receive signals of available channels. The path of a received signal from the antenna 21 to the mixers 211 and 212 in the LBT scheme is plotted by a dotted line 411.

The controller unit 409 controls connection states of the switches 401 and 405, and controls the output frequency of the PLL 407. In the conventional reader with the structure in FIG. 2, a CW signal transmitted by another reader is filtered by the DC removers 213 and 214, as mentioned above, which results in failing to support the LBT scheme. By contrast, in the present invention, the controller 409 of FIG. 4 may use two ways of support the LBT scheme. These two ways to support the LBT scheme will now be described in detail with reference to FIGS. 5 and 6.

Figure 5:
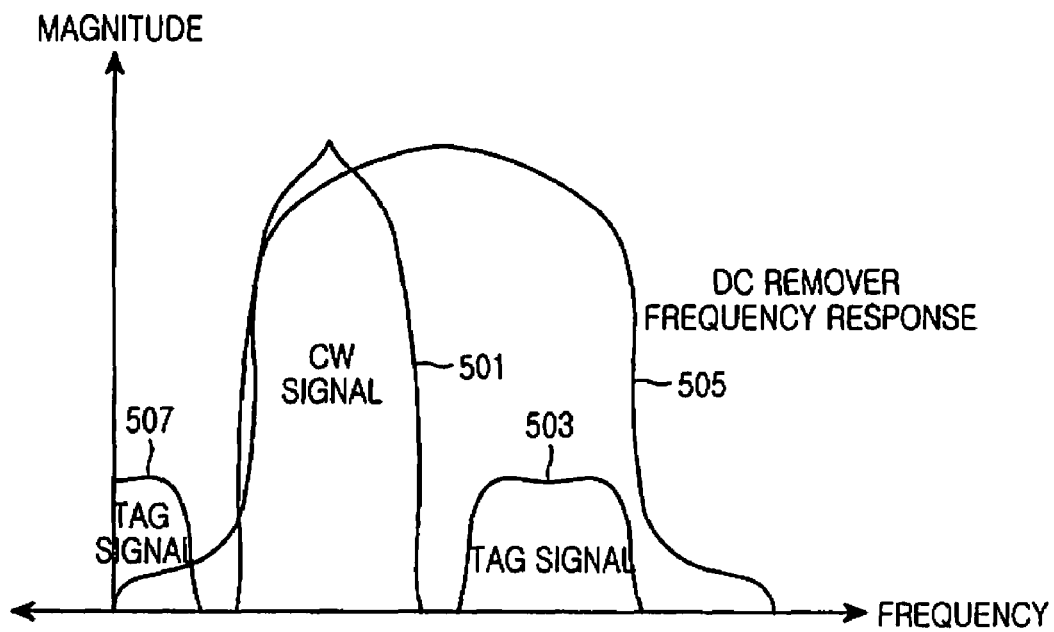
FIG. 5 is a conceptual view for explaining a method for a reader to support the LBT scheme in accordance with an exemplary embodiment of the present invention.
Figure 6:
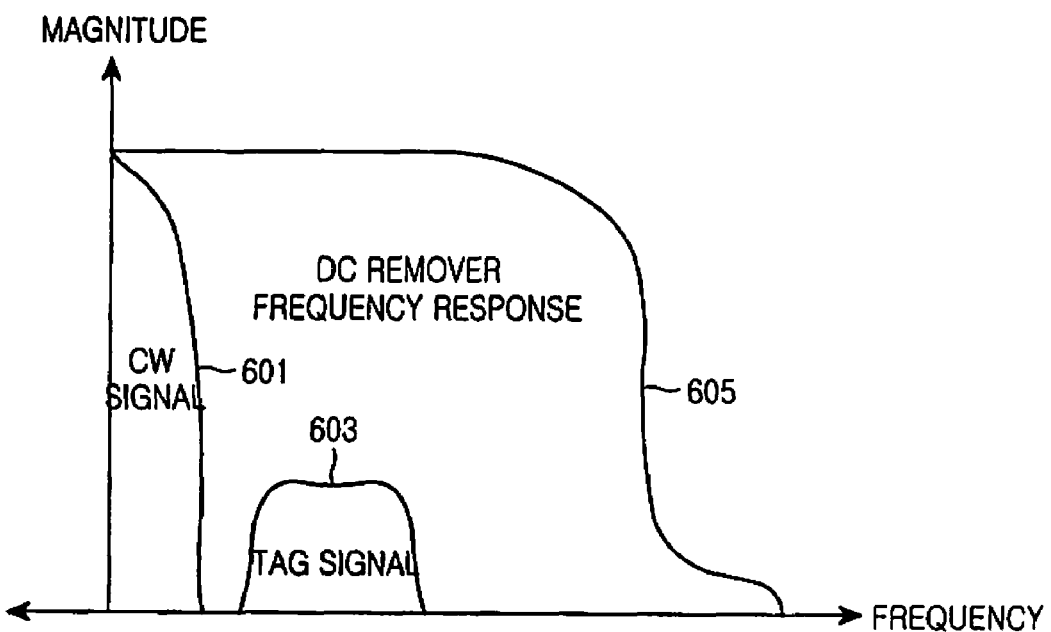
FIG. 6 is a conceptual view for explaining a method for a reader to support the LBT scheme in accordance with another exemplary embodiment of the present invention.

FIG. 5 illustrates a conceptual view for explaining a method for a reader to support the LBT scheme according to an exemplary embodiment of the present invention, and FIG. 6 illustrates a conceptual view for explaining a method for a reader to support the LBT scheme according to another exemplary embodiment of the present invention.

The way to support the LBT scheme according to the embodiment illustrated in FIG. 5 is a method in which a CW signal generated by another reader is detected by shifting the fundamental frequency of any channel by a prescribed frequency $\Delta f$. In the present invention, the way described in FIG. 5 is referred to as the "frequency shift method".

Figure 3:
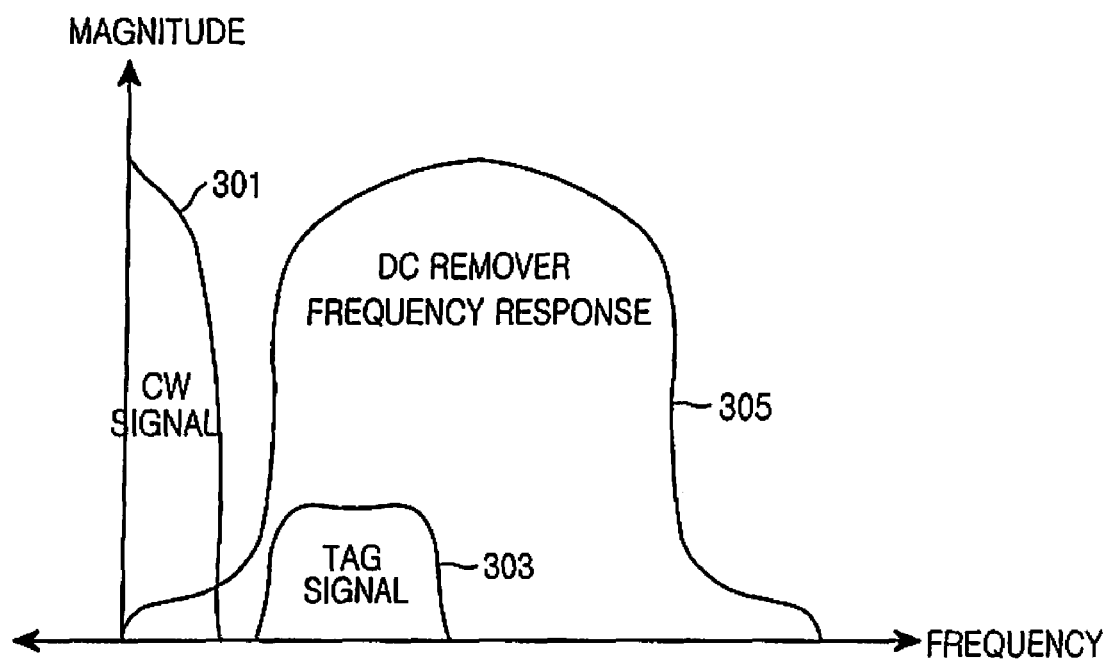
FIG. 3 is a view illustrating a frequency spectrum of a received signal in a conventional reader.

As described in connection with FIG. 3, the DC removers 213 and 214 of the reader illustrated in FIG. 2 have a frequency response curve 305 that can detect a tag signal 303 received from the tag 11. However, a CW signal 301 generated by another reader cannot be detected because the CW signal 301 is out of the region of the frequency response curve 305.

In contrast, the DC removers 213, 214 illustrated in FIG. 5 have a frequency response curve 505, within the region of which a CW signal 501 generated by another reader and a tag signal 502 transmitted by the tag 11 in response thereto coexist. Thus, according to the frequency shift method in FIG. 5, the CW signal 501 can be detected. This method is implemented in such a manner that the controller unit 409 controls the PLL 407 correspondingly. That is, if the PLL 407 generates a frequency that is shifted by $\Delta f$ from the fundamental frequency of a corresponding channel, the center frequency of the CW signal 501 shifts within the frequency response curve of the DC removers 213 and 214. Thus, the CW signal 501 is not filtered by the DC removers 213 and 214, but passes through them.

Dissimilar to FIG. 5, the way to support the LBT scheme according to the embodiment illustrated in FIG. 6 is a method in which a frequency response curve of the DC removers 213 and 214 is converted into that of a low-pass filter. In the present invention, this method is referred to as the "filter conversion method". As illustrated in FIG. 6, if the frequency response curve of the DC removers 213 and 214 is converted into that of a low-pass filter by the filter conversion method, a CW signal 601 is not removed by the DC removers 213 and 214. The filter conversion method may be implemented in such a manner that the controller unit 409 converts the frequency response characteristic of the DC removers 213 and 214 into a low-pass filter characteristic.

For each available channel, whether a corresponding channel is occupied is determined according to frequency bands by the frequency shift method or the filter conversion method, and then a CW signal is transmitted over one channel of unused channels.

In the structure of FIG. 4, the LBT or FHSS scheme may be selected by a user or by information provided from the host computer 30. However, the selection of the LBT or FHSS scheme is not the subject of the present invention, so a further description thereof will be omitted. Also, it should be noted that the frequency shift method and the filter conversion method described in FIGS. 5 and 6 may be applied to readers as will be described below in FIGS. 7 to 10. Reference will now be made to other structures of a reader that can support the FHSS and LBT schemes in a similar manner as the reader of FIG. 4.

Figure 7:
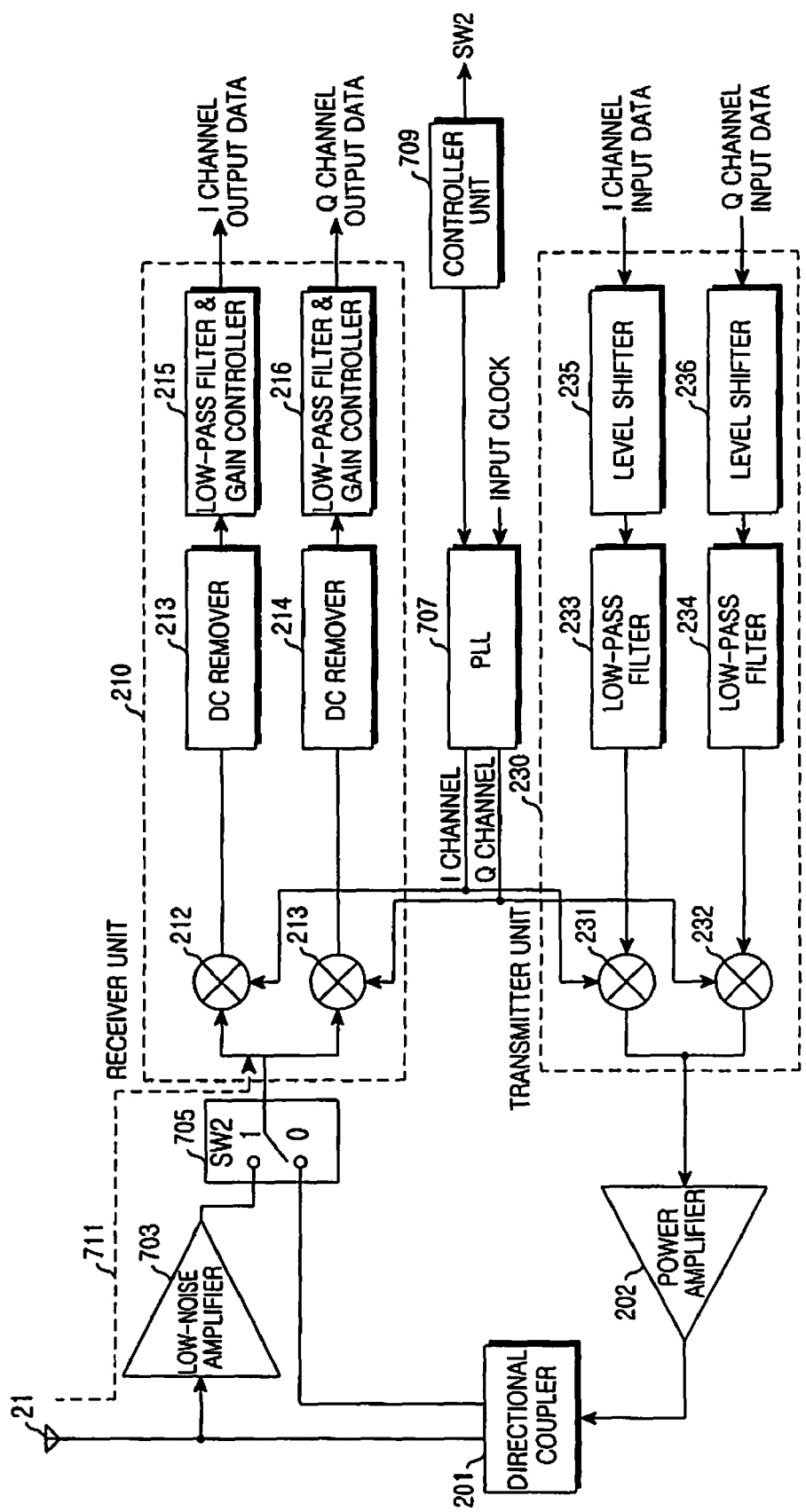
FIG. 7 is a block diagram illustrating a structure of a reader supporting the LBT scheme in accordance with a second exemplary embodiment of the present invention.

FIG. 7 illustrates the structure of a reader supporting the LBT scheme according to a second exemplary embodiment of the present invention. In comparison with the reader of FIG. 2, the reader illustrated in FIG. 7 further includes one low-nose amplifier 703 and one switch 705. A controller unit 709 controls a PLL 707 and the switch 705. The switch 705 is set to position "0" in the FHSS scheme, and is set to position "1" in the LBT scheme so that a signal received by an antenna 21 can pass through the low-noise amplifier 703 and be input into mixers 211, 212. The path of the signal input from the antenna 21 to the mixers 211 and 212 is plotted by a dotted line 711. The operations of the reader in the FHSS and LBT schemes are the same as those described above in FIG. 4, so a detailed description thereof will be omitted.

Figure 8:
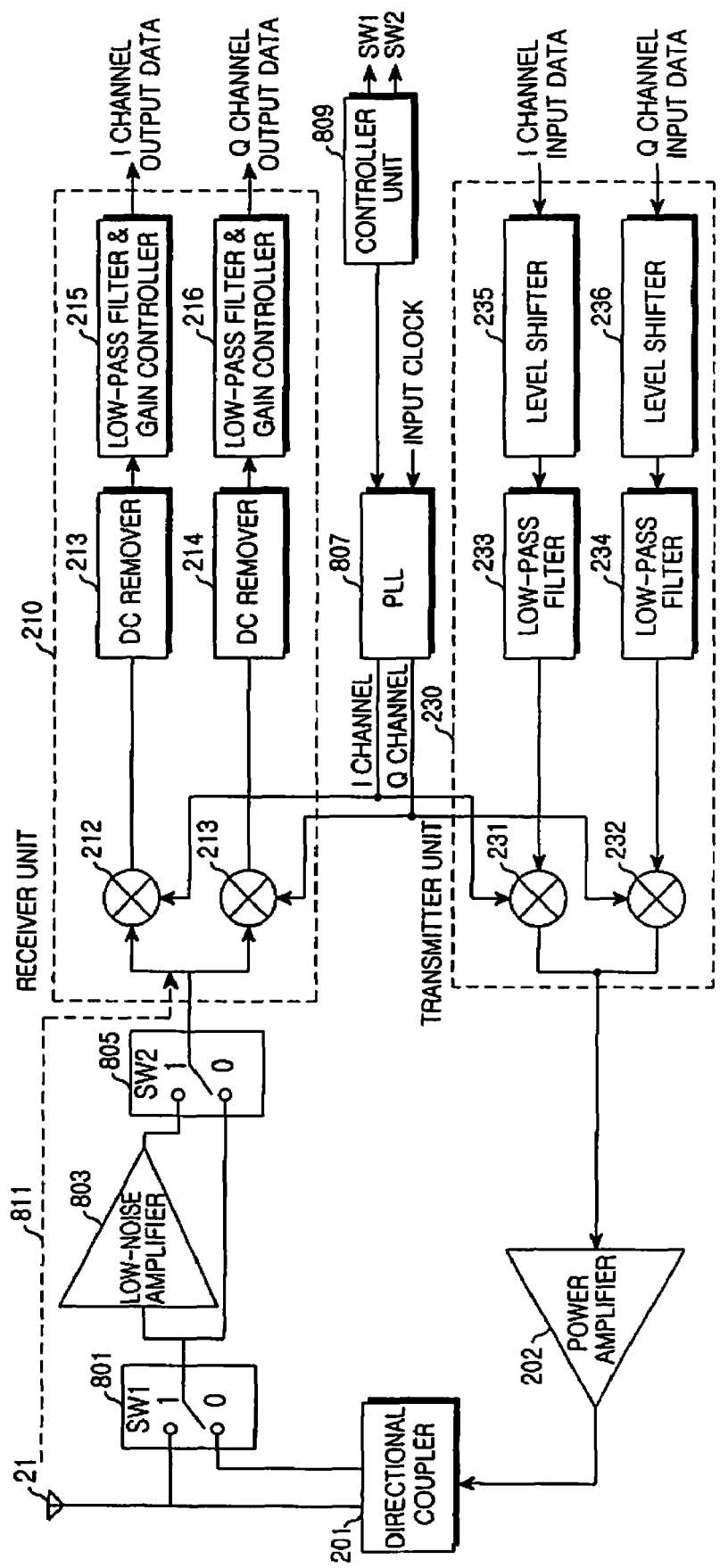
FIG. 8 is a block diagram illustrating a structure of a reader supporting the LBT scheme in accordance with a third exemplary embodiment of the present invention.

FIG. 8 illustrates the structure of a reader supporting the LBT scheme according to a third exemplary embodiment of the present invention. Similar to the reader illustrated in FIG. 4, the reader of FIG. 8 includes two switches 801, 805 and one low-noise amplifier 803, but the reader's complexity can be reduced to a complexity below the complexity of the reader illustrated in FIG. 4 because the number of signals input into the RF unit decreases by one as compared to the reader of FIG. 4. The path of a received signal from an antenna 21 to mixers 211 and 212 in the LBT scheme is plotted by a dotted line 811. The operations of the reader in the FHSS and LBT schemes are the same as those described above in FIG. 4, so a detailed description thereof will be omitted.

Figure 9:
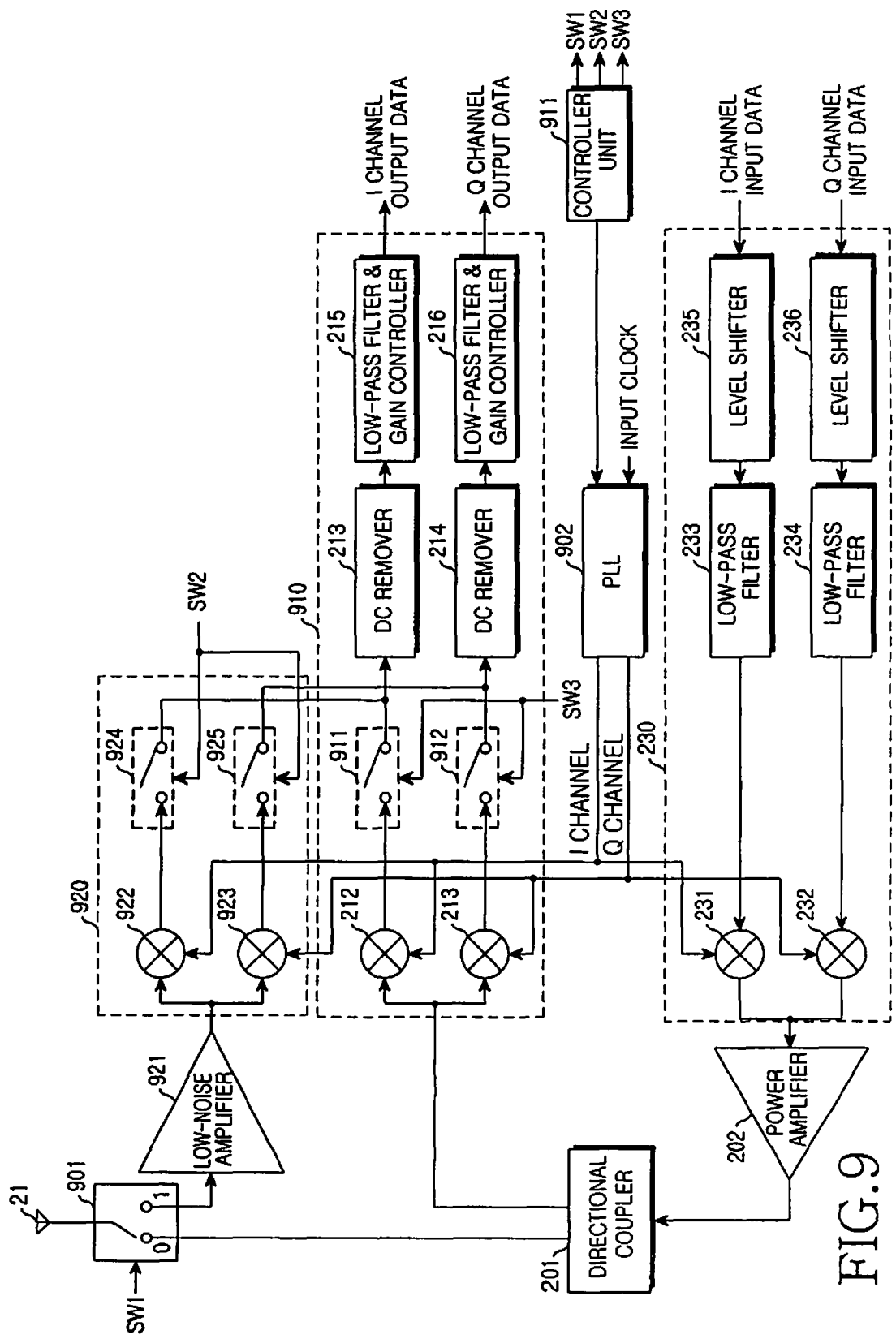
FIG. 9 is a block diagram illustrating a structure of a reader supporting the LBT scheme in accordance with a fourth exemplary embodiment of the present invention.

FIG. 9 illustrates the structure of a reader supporting the LBT scheme according to a fourth exemplary embodiment of the present invention. The reader of FIG. 8 includes a first receiver unit 910 for processing a received signal in the FHSS scheme and a second receiver unit 920 for processing a received signal in the LBT scheme. Each of the readers described in FIGS. 4 to 9 has one receiver unit 210 that performs both the FHSS and LBT schemes, but the reader of FIG. 9 is different from the other readers in that the two receiver units 910 and 920 perform the FHSS and LBT schemes, respectively. Reference will now be made in detail to the embodiment illustrated in FIG. 9.

First of all, the operation of the reader in the FHSS scheme will be discussed. A controller unit 911 controls an antenna switch 901 to connect an antenna 21 with a directional coupler 201, controls switches 924, 925 of the second receiver unit 920 to be disconnected, and controls switches 911 and 912 to be connected. Subsequently, the first receiver unit 910 operates in the same manner as that in which the receiver unit 210 of FIG. 4 processes a received signal in the FHSS mode, so a description thereof will be omitted.

Next, the operation of the reader in the LBT scheme will be discussed. The controller unit 911 controls the antenna switch 901 to the antenna 21 with the second receiver unit 920, controls the switches 924 and 925 of the second receiver unit 920 to be connected, and controls the switches 911 and 912 of the first receiver unit 910 to be disconnected. If the switches 924 and 925 are connected, a signal received by the antenna 21 is input into the second receiver unit 920, and is amplified by a low-noise amplifier 921 before being input into the second receiver unit 920. The low-noise amplifier 921 amplifies the received signal, and outputs the amplified signal to each of mixers 922 and 923 corresponding to I and Q channels. Each of the mixers 922 and 923 mixes a signal input from the low-noise amplifier 921 with a signal output from a PLL 902, down-converts the mixed signal to a low frequency band, and then outputs the down-converted signal. The down-converted signals output from the respective mixers 922 and 923 pass through and are output from DC removers 213 and 214 and low-pass filters 215 and 216 of the first receiver unit 910, respectively. As mentioned above, since the DC removers 213 and 214 and the low-pass filters 215 and 216 of the first receiver unit 910 are shared by the second receiver unit 920 when a signal received by the second receiver unit 920 is processed, the complexity of the reader can be reduced. Although not illustrated in the drawing, it is obvious that the second receiver unit 920 may additionally include DC removers and low-pass filters for separately processing a signal input into the second receiver unit 920.

The two switches provided in each of the first and second receiver units 910 and 920 may be omitted. This is because the path of a received signal may be controlled by the switch 901 that connects the antenna 21 with the second receiver unit 920 or the directional coupler 201.

In the foregoing, the structures of the readers supporting the LBT scheme have been discussed. In the LBT scheme, it is very important to rapidly search for an idle channel because whether a currently selected channel is occupied by another reader must be c determined, as mentioned above. In a Modified RFID (mRFID) system where 25 channels are supported, the 25 channels may be checked in sequence. However, if a plurality of channels can be checked at once, the overall system performance will be improved. Reference will now be made in detail to an apparatus for searching for an idle channel in an RFID system.

Figure 10:
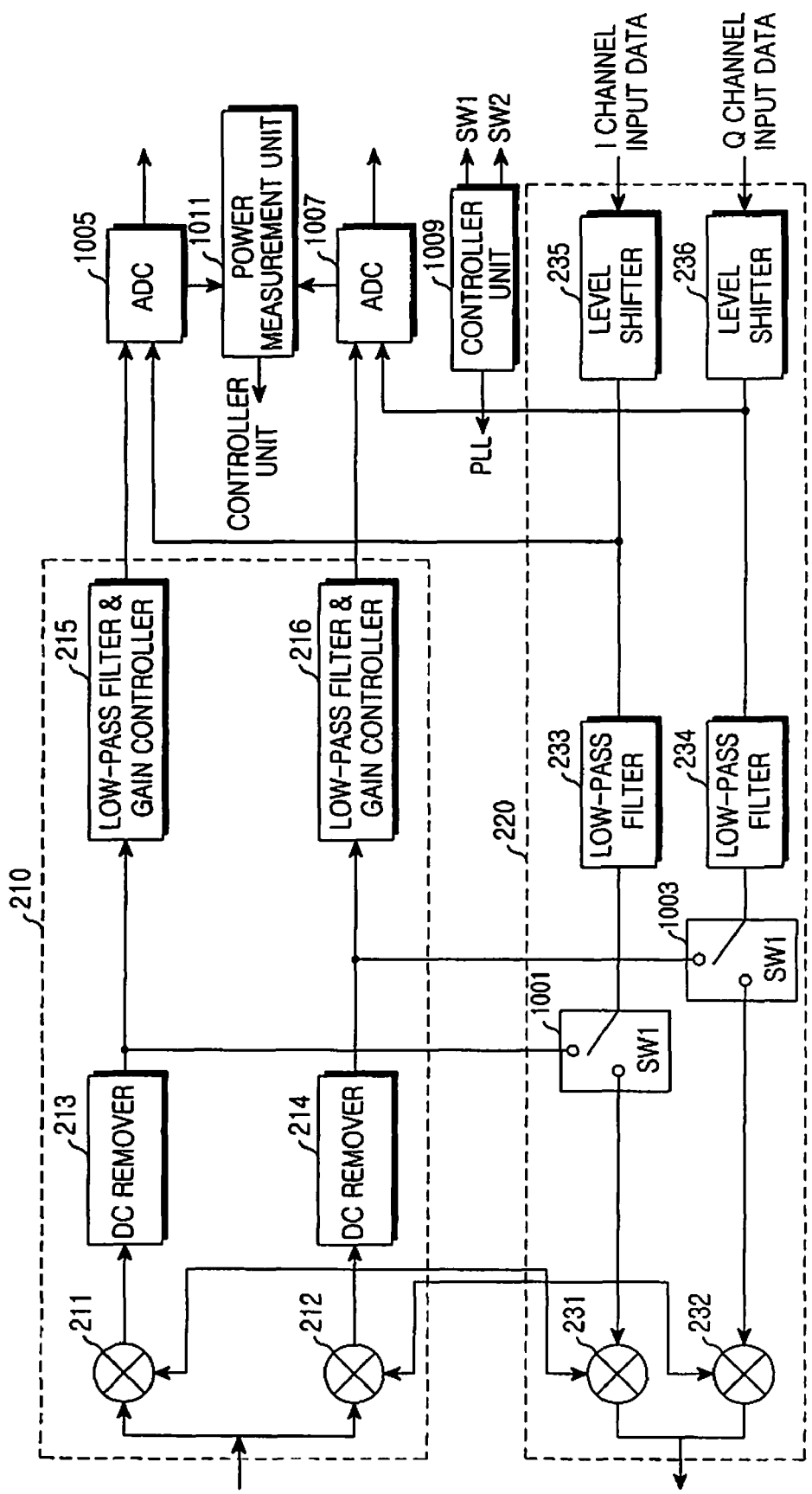
FIG. 10 is a block diagram illustrating a structure of a reader supporting the LBT scheme in accordance with a fifth exemplary embodiment of the present invention.

FIG. 10 illustrates the structure of a reader supporting the LBT scheme according to a fifth exemplary embodiment of the present invention. For the convenience of explanation, FIG. 10 illustrates only a structure for searching for an idle channel. In FIG. 10, a receiver unit 210 has the same structure as that the receiver unit in FIG. 4. Although FIG. 10 additionally illustrates Analog-to-Digital Converters (ADCs) 1005, 1007, each of which performs a function of converting a digital signal output from each low-pass filter 214 and 215 into an analog signal, the ADCs 1005 and 1007 are also included in the structure of FIG. 4, and are not illustrated in FIG. 4 for convenience. Also, a power measurement unit 1011 can measure the power of a received signal.

The structure of FIG. 10 will be described on the assumption that the reader operates in the LBT scheme. Thus, if a controller unit 1009 confirms that the operation in the LBT scheme is to be performed, the controller unit 1009 controls switches 1001 and 1003 of a transmitter unit 220 to be connected with DC removers 213 and 214 of a receiver unit 210. By connecting the switches 1001 and 1003 with the DC removers 213 and 214, it is possible to check two channels at once.

In the LBT scheme, a signal input into mixers 211 and 212 through an antenna 21 includes a plurality of CW signals that are used in channels currently occupied by other readers. Thus, if the frequency responses of the DC removers 211 and 212 is controlled in such a manner that two frequency band signals pass through the DC removers 211 and 233, by using the frequency shift method described above in FIG. 5, the two frequency band signals can pass through the DC removers 211 and 212. Subsequently, one of the frequency band signals having passed through the DC removers 211 and 212 is input into and processed by low-pass filters/gain controllers 215 and 216 of the receiver unit 210, and the other frequency band signal is processed by low-pass filters 233 and 234 of the transmitter unit 220. The processed signals are input into the ADCs 1005 and 1007, and the ADCs 1005 and 1007 convert the input signals into digital signals.

The signals having passed through the ADCs 1005 and 1007 are delivered to a baseband processor unit (not illustrated), and the power of each of the received signals is measured therein. The signals output from the ADCs 1005 and 1007 may also be delivered to the power measurement unit 1011 in place of the baseband processor unit. The power measurement unit can measure the power of the received signal even without transferring the received signal to the baseband processor unit, and delivers a measured power value to the controller unit 1009. The controller unit 1009 determines if a corresponding channel is an idle channel, by using the measured power value. If the corresponding channel is not an idle channel, the frequency of the PLL 221 is controlled so as to check a next channel. However, if the corresponding channel is an idle channel, a CW signal is transmitted over the corresponding channel.

By sharing the ADCs 1005 and 1007 in processing the two frequency band received signals, the complexity of the overall system structure can be reduced. In some cases, it is possible to additionally provide ADCs (not illustrated) for separately processing signals that have passed through the low-pass filters 233 and 234 of the transmitter unit 220. Also, according to the filter conversion method described above in FIG. 6, the controller unit 1009 can control the frequency response characteristics of the DC removers 213 and 214 to pass tow frequency band signals through the DC removers 213 and 214. In the present invention, such schemes in which a plurality of channels can be checked for their occupation statuses are defined as "simultaneous channel check".

It should be noted that the structure for performing the simultaneous channel check, as described in FIG. 10, may be applied to the readers illustrated in FIGS. 4 and 7 to 9. Although a plurality of channels used in the simultaneous channel check generally adjoin each other, they may be selected in various ways by predetermined settings according to channel conditions, etc. The frequency spectrum of a received signal in the structure of FIG. 10 is illustrated in FIG. 11 to be described below.

In FIG. 10, the structure for the simultaneous channel check has been described in connection with a case where a check for two channels is performed. However, it is also possible to provide a structure for simultaneously checking three or more channels. For example, a structure for simultaneously checking five channels will be described. First, the frequency response characteristics of the DC removers 213 and 214 are changed in such a manner that frequency band signals of five channels can pass through the DC removers 213 and 214. Among received signals of five channels that have passed through the DC removers 213 and 214, the received signals of two channels are processed by the low-pass filters 215, 216, 233, and 234 of the transmitter/receiver unit. Thus, three pairs of low-pass filters (not illustrated) for processing the received signals of the other three channels are additionally provided. The five channels can be simultaneously checked by connecting the inputs of the additional low-pass filters with the outputs of the DC removers 213 and 214, and connecting the outputs of the additional low-pass filters with the ADCs 1005 and 1007, respectively.

Figure 11:
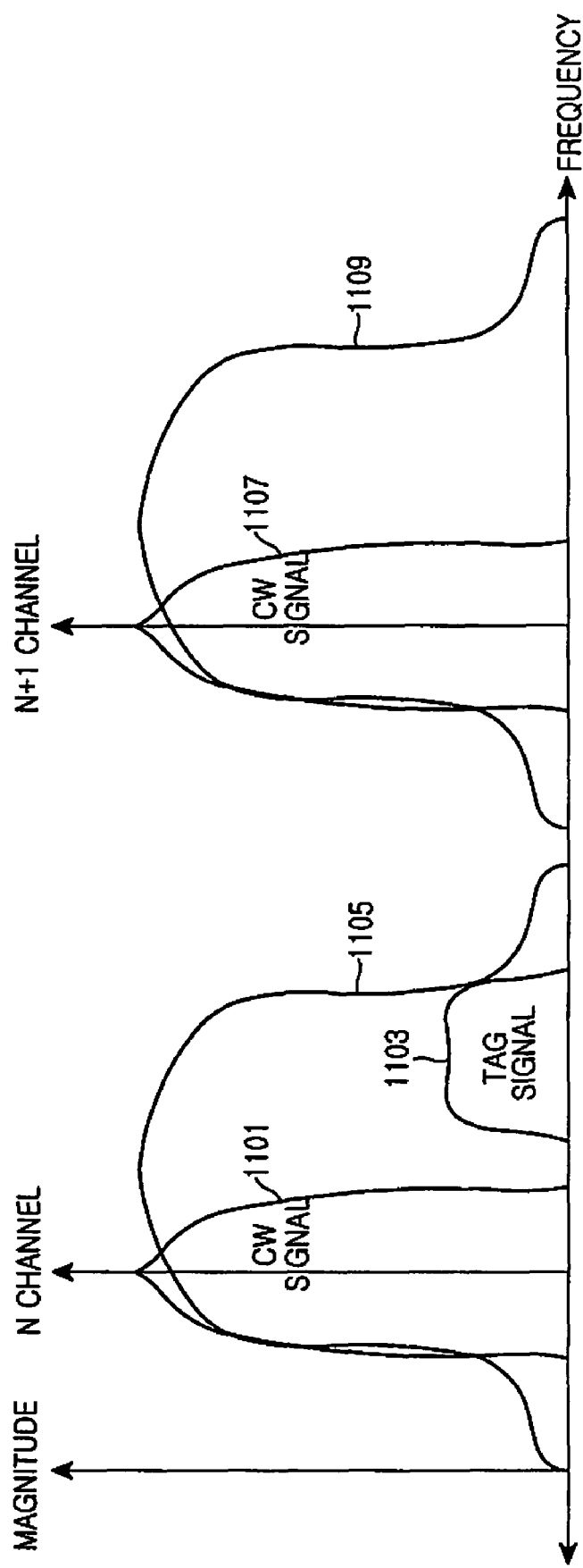
FIG. 11 is a view illustrating a frequency spectrum of a received signal in a simultaneous channel check scheme in accordance with an exemplary embodiment of the present invention.

FIG. 11 illustrates the frequency spectrum of a received signal in a simultaneous channel check scheme according to an exemplary embodiment of the present invention. That is, FIG. 11 is under a condition such that the frequency responses of the DC removers 213 and 214 are controlled in such a manner that a plurality of frequency band signals can pass through the DC removers 213 and 214, by using the frequency shift method described above in FIG. 5. For the convenience of explanation, a description will be given on the assumption that the number of the plurality of frequency bands is two. Reference numeral "1101" designates a CW signal using an Nth channel, and reference numeral "1103" designates a tag signal corresponding thereto. Reference numeral "1107" designates a CW signal using an (N+1)th channel, and reference numerals "1105" and "1109" designate the frequency response curves of the DC removers 213 and 214, respectively. Since each of the CW signals 1101 and 1107 using the two channels is located within the corresponding frequency response curve, the CW signals 1101 and 1107 can be detected without being removed by the DC removers 213 and 214.

Although not illustrated in the drawing, two frequency band signals may pass the DC removers 213 and 214 even when the DC removers 213 and 214 are controlled in such a manner as to have a low-pass filter characteristic, by using the filter conversion method described above in FIG. 6. If the frequency response characteristics of the DC removers 213 and 214 are controlled in such a manner that frequency band signals of five channels can pass through the DC removers 213 and 214, as in the example described above in FIG. 10, five frequency response curves corresponding to the five frequency bands will be illustrated in FIG. 11.

Figure 12:
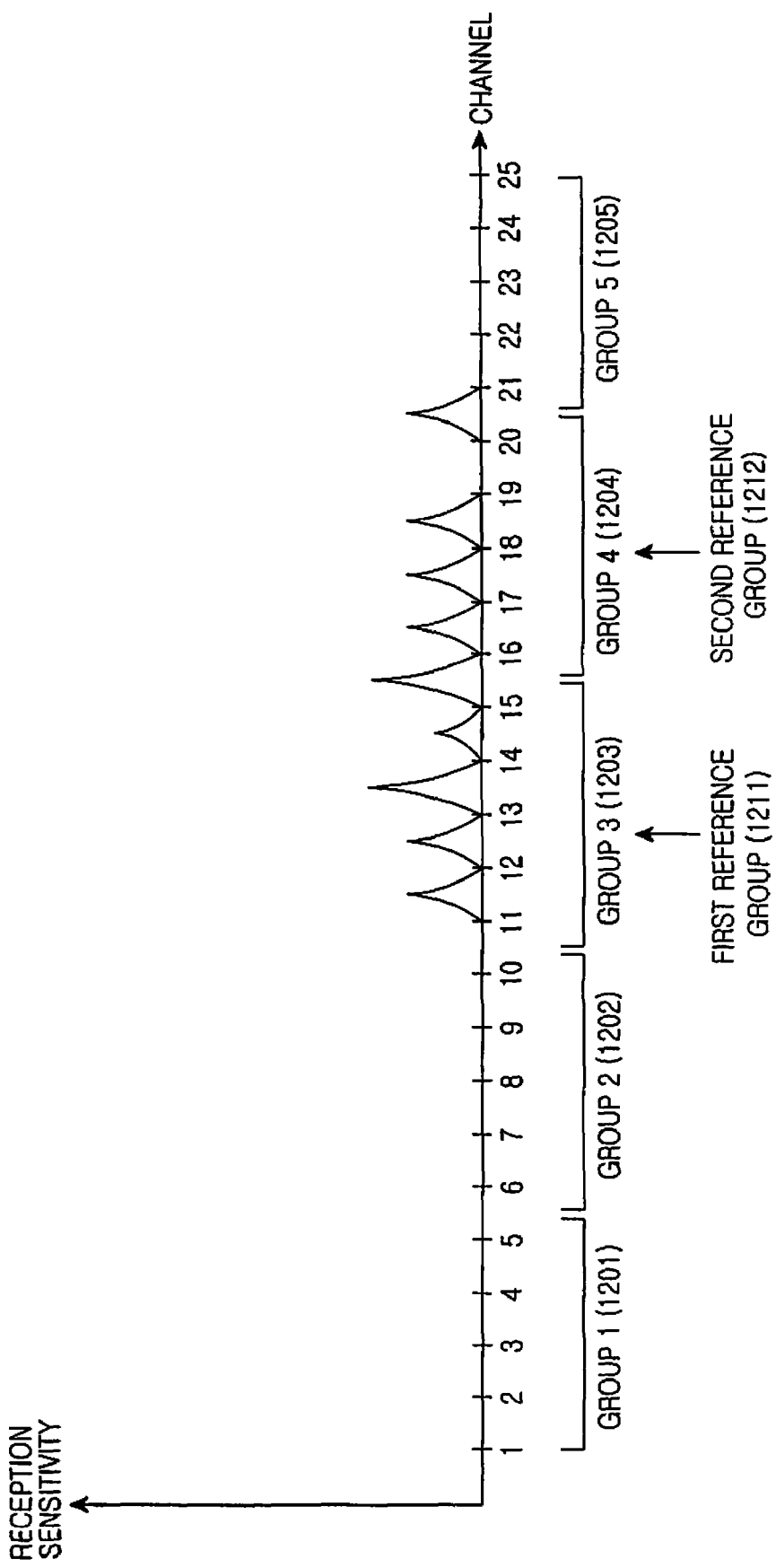
FIG. 12 is a conceptual view for explaining a procedure of checking an idle channel in accordance with an exemplary embodiment of the present invention.

FIG. 12 illustrates a conceptual view for explaining a procedure of checking an idle channel according to an exemplary embodiment of the present invention. FIG. 12 supposes an idle channel check procedure in the aforementioned mRFID system. The mRFID system is allocated 25 channels, the 25 channels are grouped into 5 groups (groups #1 to #5), each including 5 channels, and group #3 1203 located in the middle of the 25 channels is set as a first reference group 1211. Whether an idle channel exists is checked by measuring the reception sensitivities of five channels (channels #11 to #15) constituting the first reference group 1211.

In FIG. 12, the channels of group #3 1203, that is, the first reference group 1211, are all occupied, and thus an idle channel cannot be selected from the first reference group 1211. Thus, a second group to be checked must be selected. Here, the second group to be checked is called a second reference group. The second reference group corresponds to an unchecked group closest to a channel that has the lowest reception sensitivity among the five channels of the first reference group. In FIG. 12, since channel #14 of group #3 1203 has the lowest reception, and an unchecked group closest to channel #14 is group #4 1204, group #4 1204 is set as the second reference group 1212.

Subsequently, whether an idle channel exists is determined by performing reception sensitivity check for five channels (channels #16 to #20) of the second reference group 1212 (group #4 1204). Since channel #19 among the channels of group #4 1204 is an idle channel, the procedure of finding an idle channel ends. If channel #19 is occupied, group #5 1205 is set as a third reference group in the same manner as that of setting the second reference group 1212, and idle channel check is performed for the third reference group. When an idle channel is not found even in group #5, it is necessary to set a fourth reference group, and the fourth reference group will be group #2 1202 which is an unchecked group closest to group #5. The aforementioned procedure is repeated until an idle channel is found.

When an idle channel is checked in the manner described above in FIG. 10, a check speed is significantly enhanced. If 25 channels are checked in sequence, a maximum of 25 checks must be performed, but an idle channel can be found within a maximum of 5 checks when the group-by-group channel check scheme described with reference to FIG. 12 is combined with the simultaneous channel check scheme described with reference to FIG. 10.

The aforementioned procedure of grouping 25 channels into 5 channel groups (each including 5 channels) and performing idle channel check on a group-by-group basis can be implemented by combining the structure of FIG. 10 with those of FIGS. 4 and 7 to 9. This is because the transmitter unit 220 and the receiver unit 210 of FIG. 10 may be considered to process a corresponding signal of one channel, respectively, but low-pass filters for processing additional channels other than the two channels processed by the transmitter/receiver unit can be provided according to the number of channels, as mentioned above. That is, if three pairs of low-pass filters are provided, in addition to the low-pass filters of the transmitter/receiver unit, whether one group consisting of the five channels includes an idle channel can be checked at once.

Although FIG. 12 gives an example where one group consists of five channels, an idle channel check can be performed using the group-by-group channel check scheme even when one group consists of two channels. That is, in the respective structures of FIGS. 4 and 7 to 9, each of the transmitter unit 220 and the receiver unit 210 can perform idle channel checks for one channel. Reference will now be made to the group-by-group channel check scheme, with reference to FIG. 13.

Figure 13:
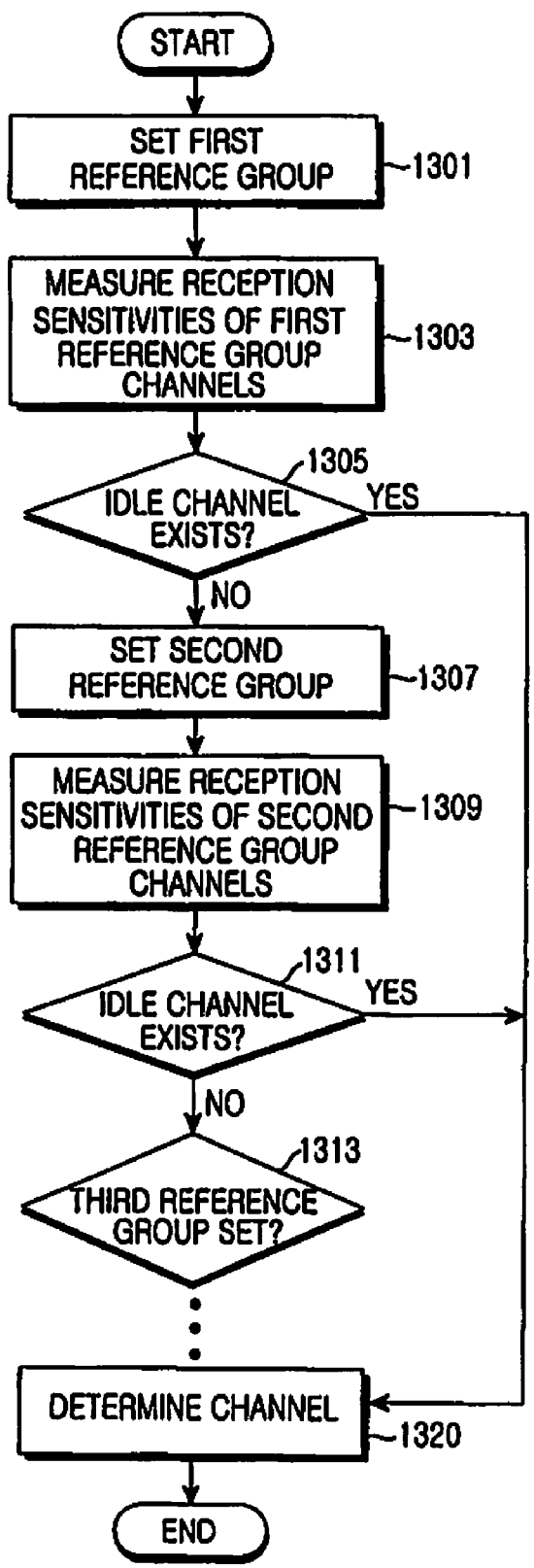
FIG. 13 is a flowchart for explaining a group-by-group channel check scheme in accordance with an exemplary embodiment of the present invention.

FIG. 13 illustrates a flowchart for explaining a group-by-group channel check scheme according to an exemplary embodiment of the present invention. In step 1301, channels allocated to an RFID system are grouped into a plurality of channel groups, and one of the plurality of channel groups is set as a first reference group. The first reference group is a channel group that is located in the middle of the channels or closest to the center of the channels among the channel groups. In step 1303, the reception sensitivity of the first reference group is measured, and the group-by-group channel check scheme goes to step 1305. The reception sensitivities of the first reference group channels may be measured using the simultaneous channel check. In step 1305, whether an idle channel exists is determined. If an idle channel exists, the group-by-group channel check scheme goes to step 1320, and determines the corresponding channel as the idle channel. However, if there is no idle channel, the group-by-group channel check scheme goes to step 1307, and sets an unused channel group, which is closest to a channel with the lowest reception sensitivity among the first reference group channels, as a second reference group. In step 1309, the reception sensitivities of the second reference group channels are measured, and whether an idle channel exists in the second reference group is determined in step 1311. If there is an idle channel, the group-by-group channel check scheme goes to step 1320. However, if there is no idle channel, the group-by-group channel check scheme goes to step 1313, and sets a third reference group in the same manner as in step 1307. The steps of setting a new reference group and determining if an idle channel exists in the newly set reference group are repeated until an idle channel is determined.

Figure 14:
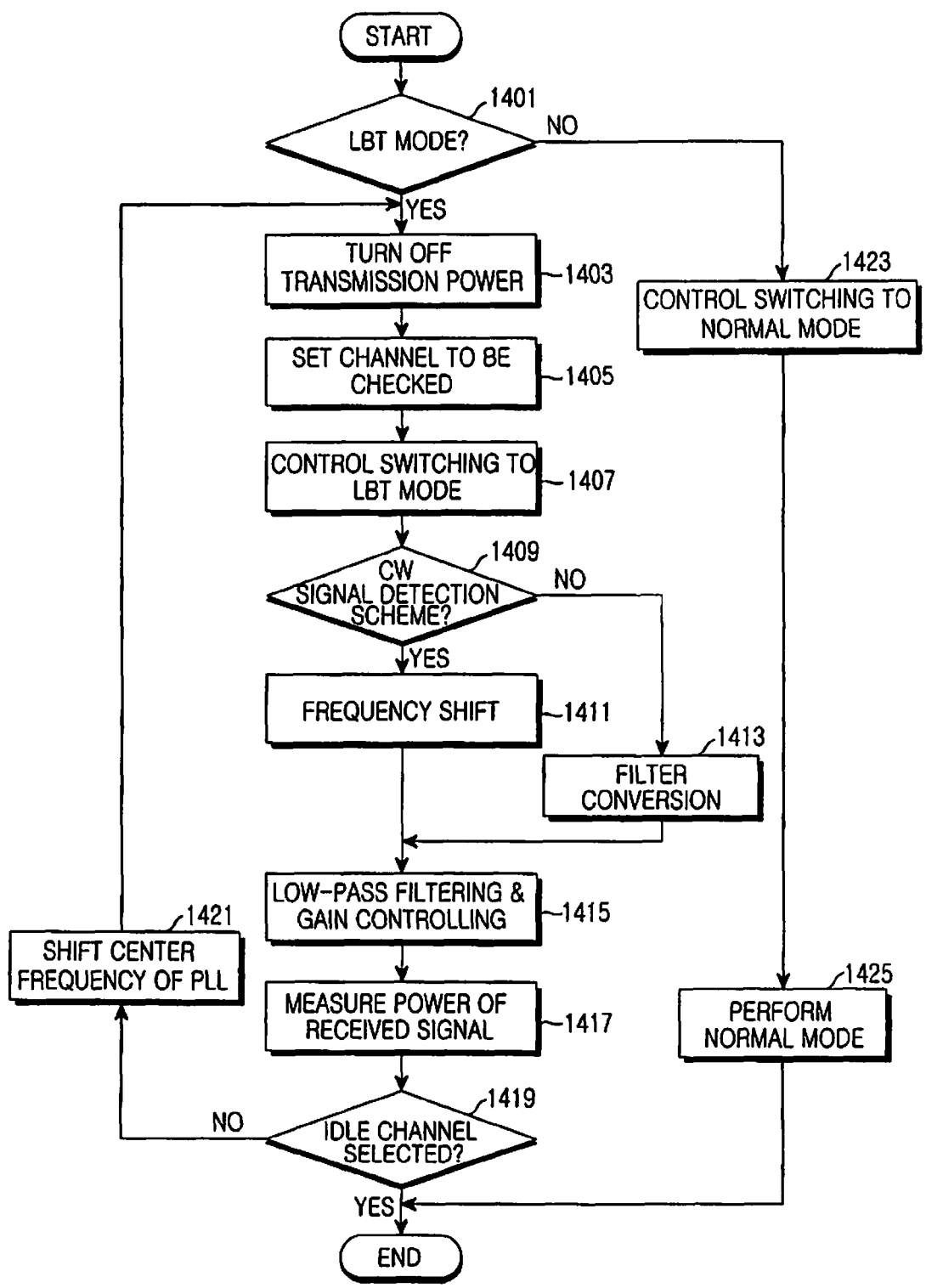
FIG. 14 is a flowchart for explaining how the LBT scheme operates in accordance with an exemplary embodiment of the present invention.

FIG. 14 illustrates a flowchart for explaining how the LBT scheme operates according to an exemplary embodiment of the present invention. In step 1401, whether the reader is in the LBT mode is checked. If the reader is not in the LBT mode, switching control according to the normal mode is performed in step 1421, and the operation corresponding to the normal mode is performed in step 1425. The normal mode refers to all operational modes including the FHSS mode and excluding the LBT mode.

If the reader is in the LBT mode in step 1401, the transmission power of the transmitter unit is turned off in step 1403. In step 1405, a corresponding channel for idle channel check is set. The corresponding channel for idle channel check may be set in the group-by-group channel check scheme described above in FIG. 13. In step 1407, the switches of the reader are controlled such that the LBT mode can be performed, which corresponds to the switch control described above in FIGS. 4 and 6 to 9. In step 1409, the scheme for detecting a CW signal may be selected. That is, either the frequency shift method described above in FIG. 5 may be selected in step 1411, or the filter conversion method described above in FIG. 6 may be selected in step 1413. In step 1415, low-pass filtering and gain control for a received signal are performed. The gain control fixes gain so as to maintain the same power level for signals of all channels to be checked. Subsequently, the power of the received signal is measured in step 1417. Here, the power measurement may be performed in the baseband processor unit (not illustrated) or may be performed in the power measurement unit 1011 illustrated in FIG. 10.

In step 1419, whether a CW signal is detected in the process of the power measurement is determined to thereby check if an idle channel exists. If an idle channel exists and is selected, the operation in the LBT mode ends. However, if there is no idle channel, the operation goes to step 1421. In step 1421, the center frequency of the PLL is shifted according to a channel next to the channel checked in the previous step. A way to set the next channel may be based on the group-by-group channel check scheme described above in FIG. 13.

The aforementioned simultaneous channel check scheme requires one DC remover for checking one channel. However, if one DC remover has a frequency band that enables multi-channel check, a check speed may increase significantly. Reference will now be made to a method in which one DC remover checks whether an idle channel exists, in units of groups, each consisting of a plurality of channels. That is, the frequency response characteristics of the DC removers 213 and 214 are extended to a frequency band corresponding to a plurality of channels. This method of extending the frequency response characteristics of the DC removers to one group unit and measuring the total power value of the group is defined as "group power check".

For example, let us suppose that one group consists of five channels. Assuming that the mean power value of a CW signal occupying one channel is 2, the total power value is near to 10 when the five channels are all occupied. If there is one idle channel among the five channels, the total power value is near to 8. Also, if there are two idle channels, the total power value is near to 6.

The reader is technically constructed as follows: The frequency response characteristics of the DC removers and the low-pass filters included in the readers of FIGS. 4 and 7 to 9 are extended corresponding to a frequency band obtained by adding up the five channels. Then, whether the corresponding group (consisting of the five channels) includes an idle channel can be discovered by measuring the total power of a signal that has passed through the DC removers and the low-pass filters. If the corresponding group is an idle group including an idle channel, which channel is the idle channel can be discovered by checking the power values of the corresponding five channels again. In order to check the power values of the corresponding five channels, the frequency response characteristics of the DC removers and the low-pass filters must be changed again corresponding to the respective channels.

If a result of the group power check shows that the channels of the corresponding group are all occupied, the group power check is performed for a next group. Such group power checks continue until a result of a check shows that the corresponding group includes an idle channel. If the corresponding channel includes an idle channel, a determination of which channel is the idle channel can be achieved by checking the power values of the respective channels of the corresponding group.

In some cases, the power values of groups are first measured, and then idle channel checks are performed for individual channels of a group that has the lowest power value. For example, when there are five groups, each of which consists of five channels, it is assumed that group #1 has a power value of 8, group #2 has a power value of 6, group #3 has a power value of 10, group #4 has a power value of 4, and group #5 has a power value of 8. Since group #4 has the lowest power value, it has the highest possibility of including an idle channel, and thus channel-by-channel power check is performed only for group #4. Otherwise, it is possible to select groups having power values below a certain reference value, and perform power check for channels of those groups.

The group power check may be rearranged as follows: A first method to implement the group power check is to find an idle group among a plurality of groups and perform power check for channels of the idle group without checking other groups. A second method is to check the power values of all the groups and perform power check for channels of a group with the lowest power value. Finally, a third method is to select groups with power values below a certain reference value and perform power check for channels of the selected groups. Any method may be selected so long as the method shows superior performance in statistical simulation.

According to the present invention as describe above, an RFID reader capable of supporting both the Frequency Hopping Spread Spectrum (FHSS) scheme and the Listen Before Talk (LBT) scheme can be implemented. Since a signal received by such an RFID reader supports high reception sensitivity, a reliable RFID system can also be implemented. Further, the overall system performance can be improved by increasing the speed of idle channel check in the LBT scheme.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for signal detection of a reader in a Radio Frequency IDentification (RFID) system, the apparatus comprising:
   a low-noise amplifier for low-noise amplifying a received signal of an antenna;
   a receiver unit for detecting a Continuous Wave (CW) signal and a tag signal in the low-noise amplified signal;
   a transmitter unit for frequency up-converting an input signal, and outputting the up-converted signal;
   a Phase Locked Loop (PLL) for generating a frequency signal according to a transmission signal band or a reception signal band, and transferring the generated frequency signal to the transmitter unit or a receiver unit;
   a receiver unit switch for connecting the receiver unit with the low-noise amplifier or a directional coupler;
   an antenna switch for connecting the antenna with the directional coupler or the low-noise amplifier; and
   a controller unit for controlling a frequency of the frequency signal generated by the PLL, turning off transmission power in a case of a Listen Before Talk (LBT) scheme, controlling the receiver unit switch to connect the receiver unit with the low-noise amplifier, controlling the antenna switch to connect the antenna with the low-noise amplifier, and determining if a corresponding channel is an idle channel, by using a power value of the signal output from the transmitter unit,
   wherein the controller unit controls the PLL to frequency shift a signal of the corresponding channel by a prescribed frequency or converts a frequency response characteristic of a Direct Current (DC) remover provided in the receiver unit into a low-pass filter characteristic corresponding to a fundamental frequency of the corresponding channel, thereby enabling the receiver unit to detect the signal of the corresponding channel where the LBT scheme is to be performed.

2. The apparatus as claimed in claim 1, wherein the receiver unit comprises low-pass filters for simultaneously detecting signals of a plurality of channels, removing DC components from the signals on detecting the signals, and low-pass filtering the DC-removed signals of the respective channels.

3. The apparatus as claimed in claim 2, wherein the transmitter unit further comprises a filter switch for connecting the low-pass filter provided therein with a mixer provided therein or with a DC remover provided in the receiver unit, the controller unit further controls the filter switch to connect the low-pass filter provided in the transmitter unit with the DC remover provided in the receiver unit, and the low-pass filter provided in the transmitter unit low-pass filters one channel of the received signal.

4. An apparatus for signal detection of a reader in a Radio Frequency IDentification (RFID) system, the apparatus comprising:
   a low-noise amplifier for low-noise amplifying a received signal of an antenna;
   a receiver unit for detecting a Continuous Wave (CW) signal and a tag signal in the low-noise amplified signal;
   a transmitter unit for frequency up-converting an input signal, and outputting the up-converted signal;
   a Phase Locked Loop (PLL) for generating a frequency signal according to a transmission signal band or a reception signal band, and transferring the generated frequency signal to the transmitter unit or a receiver unit;
   a receiver unit switch for connecting the receiver unit with the low-noise amplifier or a directional coupler; and
   a controller unit for controlling a frequency of the frequency signal generated by the PLL, turning off transmission power in a case of a Listen Before Talk (LBT) scheme, controlling the receiver unit switch to connect the receiver unit with the low-noise amplifier, and determining if a corresponding channel is an idle channel, by using a power value of the signal output from the transmitter unit,
   wherein the controller unit controls the PLL to frequency shift a signal of the corresponding channel by a prescribed frequency or converts a frequency response characteristic of a Direct Current (DC) remover provided in the receiver unit into a low-pass filter characteristic corresponding to a fundamental frequency of the corresponding channel, thereby enabling the receiver unit to detect a signal of the corresponding channel where the LBT scheme is to be performed.

5. The apparatus as claimed in claim 4, wherein the receiver unit comprises low-pass filters for simultaneously detecting signals of a plurality of channels, removing DC components from the signals on detecting the signals, and low-pass filtering the DC-removed signals of the respective channels.

6. The apparatus as claimed in claim 5, wherein the transmitter unit further comprises a filter switch for connecting a low-pass filter provided therein with a mixer provided therein or with a DC remover provided in the receiver unit, the controller unit further controls the filter switch to connect the low-pass filter provided in the transmitter unit with the DC remover provided in the receiver unit, and the low-pass filter provided in the transmitter unit low-pass filters one channel of the received signal.

7. A method for signal detection of a reader in a Radio Frequency IDentification (RFID) system, the method comprising:
   a setup step of turning off transmission power in a case of a Listen Before Talk (LBT) scheme, switching an antenna provided in the reader to a receiver unit provided in the reader, and setting a fundamental frequency corresponding to a channel where the LBT scheme is to be performed;
   a low-noise amplification step of low-noise amplifying a signal received by the antenna;

a signal detection step of frequency down-converting a signal input into the receiver unit, removing a Direct Current (DC) component from the frequency down-converted signal in a predetermined manner, and then low-pass filtering the DC-removed signal; and a channel check step of determining if the channel is an idle channel, by using a power value of the low-pass filtered signal, wherein removing the DC component from the frequency down-converted signal in the predetermined manner comprises controlling a Phase Locked Loop (PLL) to frequency shift a signal of the corresponding channel by a prescribed frequency or converting a frequency response characteristic of a DC remover provided in the receiver unit into a low-pass filter characteristic corresponding to the fundamental frequency of the corresponding channel, thereby enabling the receiver unit to detect a signal of the corresponding channel where the LBT scheme is to be performed.

8. The method as claimed in claim 7, wherein the signal detection step comprises simultaneously detecting signals of a plurality of channels by the receiver unit, removing DC components from the signals on detecting the signals, and low-pass filtering the DC-removed signals of the respective channels.

9. The method as claimed in claim 8, wherein the signal detection step further comprises the steps of:

switching a low-pass filter, which is provided in a transmitter unit included in the reader, in such a manner as to be connected with a DC remover provided in the receiver unit or with a mixer provided in the transmitter unit; and low-pass filtering one channel of the received signal by the low-pass filter provided in the transmitter unit.

10. A method for signal detection of a reader in a Radio Frequency IDentification (RFID) system, the method comprising:

a group setting step of setting a given number of neighboring channels among channels allocated to the RFID system as a channel group;

a group filter setting step of changing frequency characteristics of a Direct Current (DC) remover and a low-pass filter, which are provided in a receiver unit included in the reader, in such a manner as to correspond to an overall frequency band of the channel group;

a group filtering step of low-noise amplifying a signal of the channel group, down-converting the low-noise amplified signal to a low frequency band, removing a DC component from the down-converted signal, and low-pass filtering the DC-removed signal;

a group power measurement step of measuring a power value of the low-pass filtered signal; and an idle group check step of determining if the channel group is an idle group including an idle channel, by using the measured power value.

11. The method as claimed in claim 10, further comprising an intra-group channel check step of, if the channel group is the idle group, changing the frequency characteristics of the DC remover and the low-pass filter in such a manner as to correspond to a frequency band of a corresponding channel constituting the channel group, and measuring a power value of the corresponding channel, wherein the intra-group channel check step is repeated for the channels of the channel group until the idle channel is checked.

12. The method as claimed in claim 11, further comprising:

a next channel group setting step of, if the channel group is not the idle group, setting another given number of neighboring channels as a next channel group;

a next group filter setting step of changing the frequency characteristics of the DC remover and the low-pass filter in such a manner as to correspond to an overall frequency band of the next channel group;

a next group filtering step of low-noise amplifying a signal of the next channel group, down-converting the low-noise amplified signal to a low frequency band, removing a DC component from the down-converted signal, and low-pass filtering the DC-removed signal;

a next group power measurement step of measuring a power value of the low-pass filtered signal; and a next idle group check step of determining if the next channel group is an idle group, by using the measured power value, wherein the next channel group setting step, the next group filter setting step, the next group filtering step, the next group power measurement step, and the next idle group check step are repeated until the idle group is checked.

13. The method as claimed in claim 12, further comprising a next intra-group channel check step of, if the next channel group is the idle group, changing the frequency characteristics of the DC remover and the low-pass filter in such a manner as to correspond to a frequency band of a corresponding channel constituting the next channel group, and measuring a power value of the corresponding channel, wherein the next intra-group channel check step is repeated for the channels of the next channel group until the idle channel is checked.

* * * * *